United States Patent [19]
Katayama et al.

[11] Patent Number: 5,554,436
[45] Date of Patent: Sep. 10, 1996

[54] MAGNETO-OPTICAL RECORDING MEDIUM

[75] Inventors: Hiroyuki Katayama, Nara; Junichiro Nakayama, Shiki-gun; Naoyasu Iketani, Tenri; Kenji Ohta, Kitakatsuragi-gun, all of Japan

[73] Assignee: Sharp Kabushiki Kaisha, Osaka, Japan

[21] Appl. No.: 341,310

[22] Filed: Nov. 16, 1994

Related U.S. Application Data

[63] Continuation of Ser. No. 36,135, Mar. 24, 1993, abandoned.

[30] Foreign Application Priority Data

Apr. 22, 1992 [JP] Japan .................................. 4-101527

[51] Int. Cl.⁶ .......................... G11B 11/10; G11B 13/04
[52] U.S. Cl. ..................... 428/212; 428/457; 428/635; 428/668; 428/686; 428/694 MM; 428/694 EC; 428/900; 369/13; 365/122; 430/945
[58] Field of Search ................... 428/694 MM, 428/694 EC, 212, 635, 457, 668, 686, 900; 369/13; 430/945; 365/122

[56] References Cited

U.S. PATENT DOCUMENTS 5,278,810  1/1994  Takahashi et al. ..................... 369/13

FOREIGN PATENT DOCUMENTS 258978  3/1988  European Pat. Off. .

OTHER PUBLICATIONS

R. Malmhall et al. "Spin Directions in Exchange-Cpoupled Rare–Earth Transition Metal Double Layer Films with In–Plane Magnetic Intermediate Layer", Apr. 1992, Jpn-.J.Appl. Phys. vol. 31, pp. 1050–1054.

T. Fukami et al. "Novel direct overwriting technology for magneto–optical disks by exchange–coupled RE–TM quadrilayered films", May 1, 1990, J.Appl.Phys, 67(9) pp. 4415–4416.

Y. Nakaki et al., "Overwrite Recording and Reading on Quadrilayer MO Disks Using an Optical Head with a Red–Light LD", *Journal of The Magnetics Society of Japan*, vol. 17, Supplement No. S1 (1993).

*Primary Examiner*—Stevan A. Resan
*Attorney, Agent, or Firm*—David G. Conlin; Milton Oliver

[57] ABSTRACT

A magneto-optical recording medium is composed of first through fourth magnetic layers laminated in this order in such a way that an exchange coupling exists between any adjacent layers of the first through fourth magnetic layers so that a magnetization direction can be copied, wherein the first magnetic layer is a memory layer, the second magnetic layer is a writing layer, the third magnetic layer is a switching layer, and the fourth magnetic layer is an initializing layer. Further, respective Curie temperatures $Tc_i$ satisfy an inequation $Tc_3<Tc_1<Tc_2$, $Tc_4$ (i=1, 2, 3, or 4 indicating an ordinal number of the magnetic layers); and the second magnetic layer exhibits an in-plane magnetization at room temperature, whereas, exhibits a perpendicular magnetization above a predetermined temperature set between the room temperature and $Tc_3$ temperature. With this arrangement, after information is recorded on the memory layer based on the magnetization direction, the interface wall energy can be reduced, and the whole magnetic energy can be made substantially equivalent irrespective of the magnetization condition after recording. As a result, a stable recorded condition of the memory layer can be achieved.

10 Claims, 5 Drawing Sheets

FIG.1(a) "0"
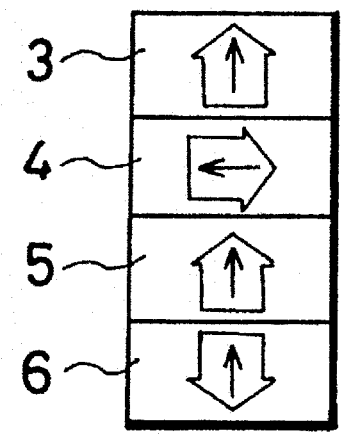
FIG.1(b) "1"
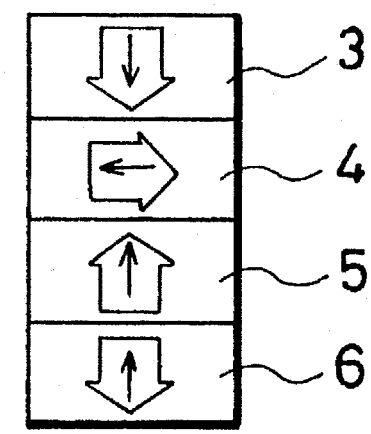
FIG. 2
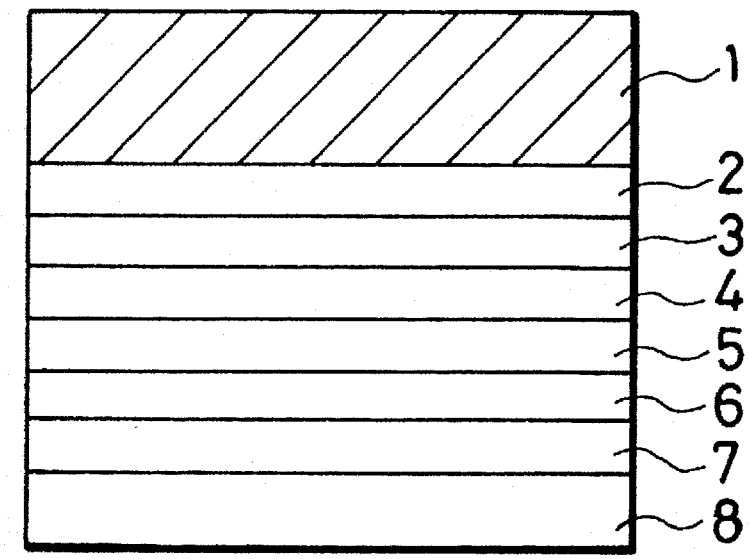

Low temp. process

High temp. process

MAGNETO-OPTICAL RECORDING MEDIUM

This is a continuation of application Ser. No. 08/036,135 filed on Mar. 24, 1993 and now abandoned.

FIELD OF THE INVENTION

The present invention relates to a magneto-optical recording medium whereon a direct overwrite is permitted by the light intensity modulation method.

BACKGROUND OF THE INVENTION

A magneto-optical recording medium whereon a direct overwrite is permitted by the light intensity modulation method is provided with a plurality of magnetic layers being laminated wherein an exchange coupling exists between the adjacent magnetic layers. The above magneto-optical recording medium has been viewed with interest for high speed data transfer, and has been earnestly studied. For a magnetic substance of the magnetic layers, rare-earth transition metal alloys (hereinafter referred to as RE-TM) having a perpendicular magnetic anisotropy are known.

For the magneto-optical recording medium, a magneto-optical disk with RE-TM quadrilayered films has been known (see J. Appl. Phys. Vol.67(1990), FUKAMI et al. pp.4415–4416 published by American Institute of Physics).

The above magneto-optical disk does not require an initializing magnet. This advantage can be taken to miniaturize the device. As shown in FIG. 6, a magneto-optical disk 20 includes a transparent substrate 21 whereon a first magnetic layer 22, a second magnetic layer 23, a third magnetic layer 24, and a fourth magnetic layer 25 are laminated in this order.

The magneto-optical disk 20 has an exchange coupling in the adjacent magnetic layers. Additionally, respective Curie temperatures Tci of the magnetic layers 22, 23, 24, and 25 (i=1, 2, 3, or 4 indicating the ordinal number of the magnetic layer) satisfy the following inequation.

$$Tc_3 < Tc_1 < Tc_2, Tc_4 \qquad (1)$$

The first magnetic layer 22 serves as a memory layer for recording thereon information using the magnetization direction. On the other hand, neither of the second magnetic layer 23, the third magnetic layer 24, and the fourth magnetic layer 25 has a function as a carrier of the information. These layers are provided so as to enable the direct overwrite by the light intensity modulation method.

The second magnetic layer 23 is used for recording through a high temperature process, and it is also used for initializing through a low temperature process.

The third magnetic layer 24 serves as a switching layer for switching off the exchange coupling from the fourth magnetic layer 25 in the high temperature process.

The fourth magnetic layer 25 is arranged such that $Tc_4$ thereof is set above the temperature range in which an overwrite is permitted, so that the magnetization direction of the fourth magnetic layer 25 is not reversed. At room temperature, the sublattice magnetization direction of the second magnetic layer 23 is arranged in that of the fourth magnetic layer 25 by the exchange coupling through the third magnetic layer 24, thereby initializing the second magnetic layer 23.

The direction of the fourth magnetic layer 25 is arranged in one direction (for example, upward), and the Curie temperature thereof is set the highest. Therefore, even when the temperature of the fourth magnetic layer 25 is raised by projecting the laser beam, the magnetization direction thereof will not be reversed. Additionally, the above magnetization is the summation of the respective sublattice magnetizations of the rare-earth metal and the transition metal.

The overwrite process is as follows: The sublattice magnetization direction of the first magnetic layer 22 is arranged in the initialized sublattice magnetization direction of the fourth magnetic layer 25 by the exchange coupling in the low temperature process. On the other hand, the sublattice magnetization direction of the first magnetic layer 22 is arranged in the direction opposite to the sublattice magnetization direction of the fourth magnetic layer 25 by the external magnetic field Hex for recording (bias magnetic field) in the high temperature process. With the above arrangement, the overwrite is permitted on the first magnetic layer 22, thereby recording information.

The high temperature process is a recording process wherein after arranging the magnetization direction of the second magnetic layer 23 in the direction of the external magnetic field Hex for recording, the arranged magnetization direction is copied to the first magnetic layer 22 at a temperature between $Tc_3$ and $Tc_1$ (see FIG. 7). Here, the magnetization direction of the external magnetic field for recording Hex is set the direction opposite to the sublattice magnetization direction of the fourth magnetic layer 25.

More concretely, as shown in FIG. 7, in the case where the temperature of the magneto-optical disk 20 is raised to the vicinity of $Tc_2$ by increasing the laser power, the direction of the sublattice magnetization of the fourth magnetic layer 25 is not changed since the temperature thereof is below $Tc_4$. On the other hand, the magnetizations of the first magnetic layer 22 and the third magnetic layer 24 disappear as the temperatures thereof are respectively raised above $Tc_3$ and $Tc_1$.

Therefore, the magnetization of the second magnetic layer 23 is reversed in the direction of the external magnetic field Hex for recording without being affected by the exchange coupling from the first magnetic layer 22 nor from the third magnetic layer 24.

Thereafter, when the temperature of the magneto-optical disk 20 is dropped below $Tc_1$, the magnetization direction of the second magnetic layer 23 is copied to the first magnetic layer 22. Further, when the temperature of the magneto-optical disk 20 is dropped below $Tc_3$, the sublattice magnetization of the third magnetic layer 24 is arranged in the direction of the fourth magnetic layer 25 by the exchange coupling.

As the temperature of the magneto-optical disk 20 is further dropped, the sublattice magnetization of the second magnetic layer 23 is reversed in the direction of the fourth magnetic layer 25 by the exchange coupling through the third magnetic layer 24. Since the coercivity of the first magnetic layer 22 is already large in this state, the magnetization direction thereof is not affected by the reversed magnetization of the second magnetic layer 23.

Therefore, the sublattice magnetization direction of the first magnetic layer 22 can be maintained in the direction opposite to the sublattice magnetization direction of the fourth magnetic layer 25. The above recorded state of the first magnetic layer 22 is, for example, represented by "1" state.

On the other hand, in the low temperature process, as shown in FIG. 8, the sublattice magnetization direction of the second magnetic layer 23 arranged in the sublattice magnetization direction of the fourth magnetic layer 25 is copied to the first magnetic layer 22 by the exchange coupling from the fourth magnetic layer 25 through the third magnetic layer 24.

More concretely, even when the temperature of the second magnetic layer 23 is raised to the vicinity of $Tc_1$ by increasing the laser power stronger than that used for reproducing, since $Tc_2$ is set above $Tc_1$, and thus the coercivity thereof remains large, the sublattice magnetization direction of the second magnetic layer 23 is not reversed by the external magnetic field for recording.

This means that the sublattice magnetization of the second magnetic layer 23 is copied to the first magnetic layer 22 by the exchange coupling. Thus, the sublattice magnetization direction of the first magnetic layer 22 is arranged in that of the fourth magnetic layer 25. The above state of the first magnetic layer 22 thus initialized is represented by, for example, "0" state.

Also in the low temperature process, even if the sublattice magnetization of the third magnetic layer 24 disappears as the temperature thereof is raised above $Tc_3$, the sublattice magnetization direction thereof is arranged in that of the fourth magnetic layer 25 by the exchange coupling between the third and fourth magnetic layers 24 and 25 when the temperature thereof is below $Tc_3$.

As described, the above arrangement enables the direct overwrite by the light intensity modulation method through the high temperature and low temperature processes.

However, the above arrangement has the following problem. As shown in FIGS. 9(a)(b), when the recorded states "0" and "1" of the first magnetic layer 22 are compared, the respective magnetic energy conditions are not equivalent. In the figures, a white arrow shows a magnetization, an arrow in the white arrow shows the sublattice magnetization direction of the transition metal or the rare-earth metal, an dotted line shows a high interface wall energy generated between the magnetic layers.

Namely, in the above arrangement, the energy condition between the first magnetic layer 22 and the second magnetic layer 23 is not equivalent, since a higher energy exists in the "1" state of the first magnetic layer 22 than the "0" state of the first magnetic layer 22 by an amount of an interface wall energy.

Therefore, the above arrangement of the magneto-optical disk 20 presents the problem that the recorded state of the first magnetic layer 22 becomes unstable by being reversed from the "1" state to the "0" state due to the temperature change during reproducing or storing or due to the application of an unexpected external magnetic field, etc. Thus, reliable recorded states cannot be obtained.

SUMMARY OF THE INVENTION

An object of the present invention is to provide a magneto-optical recording medium which permits a significantly improved reliability of recorded data.

In order to achieve the above object, the magneto-optical recording medium in accordance with the present invention is characterized in that the first through fourth magnetic layers, which are made of rare-earth transition metal alloys having a perpendicular magnetic anisotropy, are laminated in this order in such a way that an exchange coupling exists between the adjacent magnetic layers; the magnetic layers are composed of magnetic substances whose Curie temperatures $Tc_i$ respectively satisfy an inequation $Tc_3 < Tc_1 < Tc_2, Tc_4$ (i=1, 2, 3, or 4 indicating the ordinal number of the magnetic layer); and the second magnetic layer exhibiting an in-plane magnetization at room temperature, whereas, exhibiting a perpendicular magnetization at a temperature above a predetermined temperature set between the room temperature and $Tc_3$.

With the above arrangement, for example, the first magnetic layer is used as a memory layer, and the temperature thereof is raised to the vicinity of $Tc_1$ by the projection of the laser beam, and is cooled off to the room temperature. In this state, since the second magnetic layer exhibits the perpendicular magnetization at the temperature above the predetermined temperature, the sublattice magnetization direction of the first magnetic layer can be arranged in the sublattice magnetization direction of the fourth magnetic layer, thereby initializing the first magnetic layer which is represented by, for example, the "0" state.

Namely, when the temperature is raised, magnetization remains in the third magnetic layer until $Tc_3$. Thus, the magnetization direction of the fourth magnetic layer is copied to the magnetization direction of the second magnetic layer through the third magnetic layer. Here, since the coercivity of the first magnetic layer at the above temperature is large, the magnetization direction of the first magnetic layer is not affected by the magnetization direction of the second magnetic layer.

Thereafter, when the temperature is further raised to the vicinity of $Tc_1$, the coercivity of the first magnetic layer becomes small. As a result, the sublattice magnetization direction of the first magnetic layer is arranged in the sublattice magnetization direction of the second magnetic layer, thereby initializing the first magnetic layer.

On the other hand, when the temperature is raised to the vicinity of $Tc_2$, the magnetization direction of the first magnetic layer can be arranged in the direction of the external magnetic field for recording (bias magnetic field). Therefore, by setting the direction of the external magnetic filed opposite to the sublattice magnetization direction of the fourth magnetic layer, the sublattice magnetization direction of the first magnetic layer can be set opposite to the sublattice magnetization direction of the fourth magnetic layer. In addition, the above state of the first magnetic layer is represented by, for example, "1" state.

Namely, as the temperature is raised to the vicinity of $Tc_2$, by the external magnetic field for recording (bias magnetic field) second magnetic layer is arranged in the magnetization direction of the external magnetic field.

Thereafter, when the temperature is cooled off below $Tc_1$, the magnetization direction of the second magnetic layer is copied to the first magnetic layer. Here, $Tc_3$ of the third magnetic layer is set substantially smaller than $Tc_1$. When the temperature is in the range where the coercivity of the first magnetic layer is small, the third magnetic layer does not have the magnetization. Thus, the exchange coupling is not exerted from the fourth magnetic layer.

Here, even if the temperature is dropped below $Tc_3$, and the exchange coupling of the fourth magnetic layer is exerted onto the second magnetic layer through the third magnetic layer, as the coercivity of the first magnetic layer is large, the effect of the magnetization direction of the fourth magnetic layer can be avoided.

As a result, the sublattice magnetization direction of the first magnetic layer can be reversed with respect to the sublattice magnetization direction of the fourth magnetic layer, and the magnetization direction is maintained. The above recorded state is represented by, for example, "1" state.

In the above arrangement, by the difference in the application temperature, the perpendicular magnetization directions of the first magnetic layer can be reversed. Thus, the respective recorded states "0" state and the "1" state can be obtained.

Furthermore, by setting the predetermined temperature higher than the room temperature, the second magnetic layer exhibits the in-plane magnetization at room temperature. Thus, when the first magnetic layer is in the above recorded states, the equivalent energy condition can be achieved between the first magnetic layer and the second magnetic layer.

Compared with the conventional model, the magneto-optical recording medium with the above arrangement is improved by eliminating the occurrence of the state where the high interface wall energy exists between the first magnetic layer and the second magnetic layer which makes the energy condition unstable.

Since the arrangement of the present invention permits the stabilization of respective recorded states of the first magnetic layer (memory layer), the improved reliability can be achieved with respect to the change in the environmental condition during reproducing, or storing, such as the temperature change, the application of an unexpected magnetic field, etc.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view showing a magnetization (white arrow) and a sublattice magnetization (arrow) of each of the recorded magnetic layers in the magneto-optical recording medium of the present invention.

FIG. 2 is a view showing a configuration of the magneto-optical recording medium.

DESCRIPTION OF THE EMBODIMENTS

Figure 3:
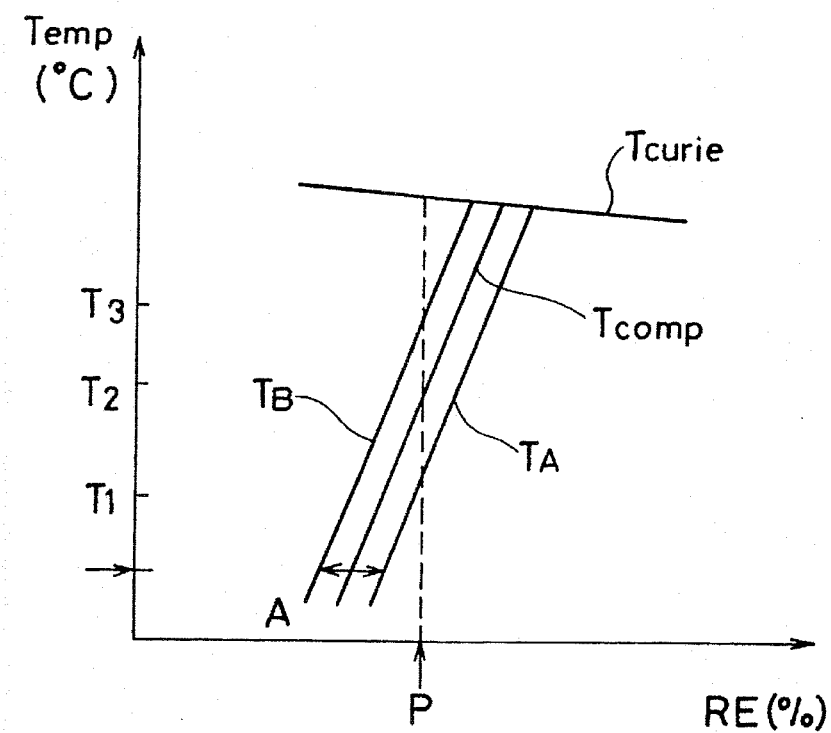
FIG. 3 is a view showing a magnetic state of the second magnetic layer in the magneto-optical recording medium.

The following description will discuss an embodiment of the present invention with reference to FIGS. 1 through 5.

As shown in FIG. 2, a magneto-optical disk (magneto-optical recording medium) of the present embodiment is provided with a substrate 1 made of a material having a property that light can be transmitted therethrough such as a glass, whereon a transparent dielectric film 2, a first magnetic layer 3, a second magnetic layer 4, a third magnetic layer 5, a fourth magnetic layer 6, a transparent dielectric film 7, and an overcoat film 8 are laminated in this order.

For a laminating method of the magneto-optical disk, for example, dc sputtering method may be employed. Additionally, it is arranged such that an exchange coupling exists between any adjacent layers of the magnetic layers 3, 4, 5, and 6.

The second magnetic layer 4 is a ferrimagnetic material composed of amorphous alloy of rare-earth transition metal. As shown in FIG. 3, the selected material for the second magnetic layer 4 is such that at a temperature below its Curie temperature, the amorphous alloy exhibits a perpendicular magnetization in a predetermined RE content range A, whereas, exhibits an in-plane magnetization outside the range A.

FIG. 3 shows the relationship between the rare-earth metal (RE in the figure) content and the Curie temperature $T_{curie}$ in the amorphous alloy. In raising the temperature, $T_A$ shows a temperature from which the amorphous alloy exhibits a perpendicular magnetization, and $T_B$ shows a temperature from which the amorphous alloy does not exhibit a perpendicular magnetization.

As can be seen from FIG. 3, the temperature range where the second magnetic layer 4 exhibits the perpendicular magnetization is extremely narrow. Moreover, the perpendicular magnetization appears only in the vicinity of a compensating composition where the magnetic moments of the rare-earth metal and the transition metal balance with one another.

Additionally, the respective magnetic moment directions of the rare-earth metal and the transition metal are set in an antiparallel direction. The rare-earth metal and the transition metal have mutually different temperature dependencies, and the magnetic moment of the transition metal can be set greater than that of the rare-earth metal at a temperature above the compensation temperature.

Therefore, the composition of alloy for the second magnetic layer 4 is selected so as to satisfy the following conditions: The content of the rare-earth metal is greater than that in the compensating composition at room temperature. Such alloy exhibits the in-plane magnetization at room temperature; whereas, the perpendicular magnetization appears as the temperature is raised.

For example, when RE content P in FIG. 3 is selected, the second magnetic layer 4 shows an abruptly rising hysteresis characteristic, i.e., the perpendicular magnetization in the temperature range of $T_1$–$T_3$. Whereas, it exhibits the in-plane magnetization, and does not show the hysteresis characteristic in the temperature ranges of room temperature—$T_1$, and $T_3$—$T_{curie}$.

Therefore, in both low temperature and high temperature processes, when the temperature of the second magnetic layer 4 is raised by projecting the laser power stronger than the laser power used in reproducing, the magnetic moment of the transition metal becomes relatively greater until it balances with the magnetic moment of the rare-earth metal, thereby exhibiting the perpendicular magnetization.

After the temperature of the second magnetic layer 4 is raised above $T_1$, and the layer 4 thus exhibits the perpendicular magnetization, the respective sublattice magnetization directions of the magnetic layers 3–6 in both high temperature and low temperature processes can be set only by modulating the intensity of the laser beam to be projected. Therefore, the overwriting is permitted on the magneto-optical disk.

Additionally, the sublattice magnetization has the magnetic moment direction of the rare-earth metal at a lattice point. Hereinafter, the sublattice magnetization implies that the direction thereof is the magnetic moment direction of the above rare-earth metal if not specified.

In order to enable the direct overwrite, the following materials are used in the present embodiment.

TbFeCo (RE-TM metal alloy) is used for the first magnetic layer 3, and the Curie temperature and thickness thereof are respectively set as follows:

Curie temperature $Tc_1=180°–230°$ C.

thickness t=30–60 nm

TbFe (RE-TM metal alloy) is used for the third magnetic layer 5, and the Curie temperature and the thickness thereof are respectively set as follows:

Curie temperature $Tc_3=100°–150°$ C.

thickness t=10–30 nm

TbCo (RE-TM metal alloy) is used for the fourth magnetic layer 6, and the Curie temperature and thickness thereof are respectively set as follows:

Curie temperature $Tc_4>250°$ C.

thickness t=30–100 nm

When $Gd_x(Fe_{0.82}Co_{0.18})_{1-x}$ (0.2<x<0.35), is used for the second magnetic layer 4, and the Curie temperature and thickness thereof are respectively set as follows:

Curie temperature $Tc_2=300°–400°$ C.

thickness t=10–30 nm

Figure 4:
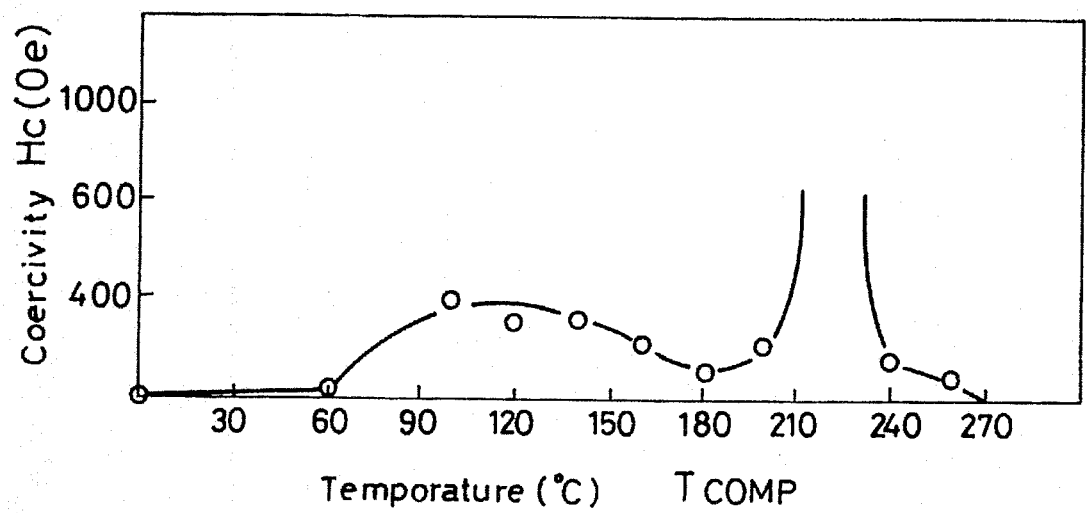
FIG. 4 is a graph showing the relationship between the coercivity and the temperature of the second magnetic layer of the present embodiment.

FIG. 4 shows a temperature dependencies of the coercivity of the second magnetic layer 4. As is clear from the figure, when the temperature of the second magnetic layer 4 is raised to the vicinity of Tu=60°–70° C., which is lower than $Tc_3$, the perpendicular magnetization appears and remains until the temperature is raised to the vicinity of 270° C. Here, Tu in FIG. 4 corresponds to $T_1$ in FIG. 3.

The dielectric film 2 is used for magneto-optical effect enhancement which increases the Kerr rotation angle utilizing an interference effect of the light in the multi-layered film. As to the material for the transparent dielectric film 2, AlN, SiN, AlSiN, etc., may be used. The thickness of the film is set substantially the value obtained by dividing a quarter of a reproducing wavelength by a refractive index. For example, when the light beam with the wavelength of 800 nm is employed for reproducing, the film thickness of the transparent dielectric film 2 is in the range of 70–100 nm.

Figure 5A:
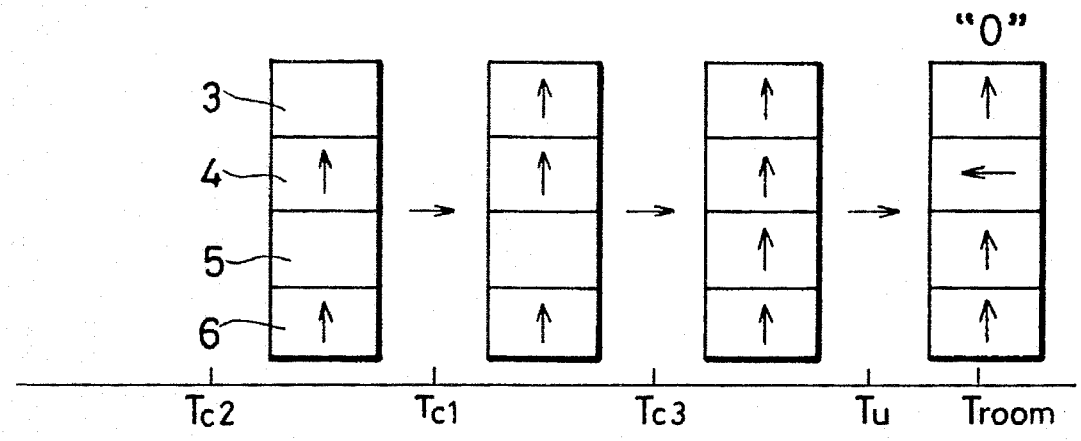
FIG. 5 is an explanatory view showing an initialization process and a recording process.
Figure 5B:
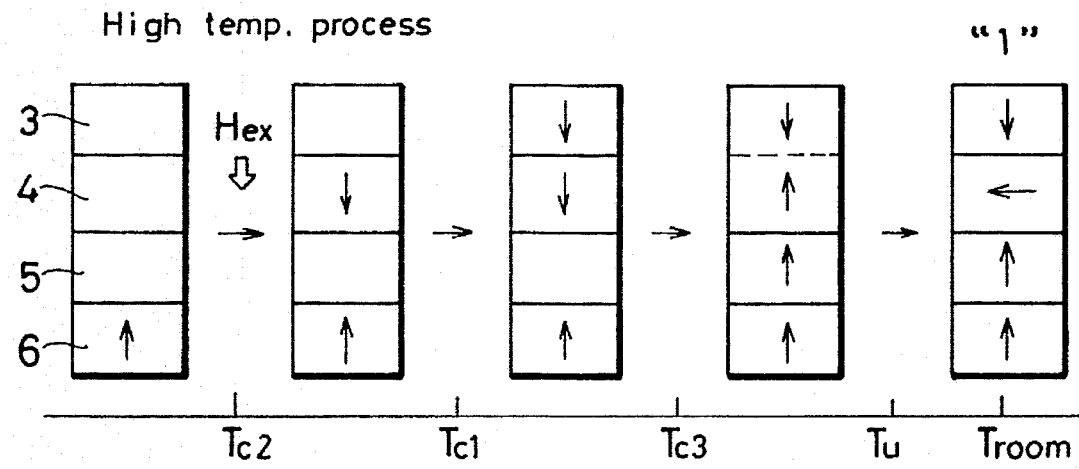
Figure 6:
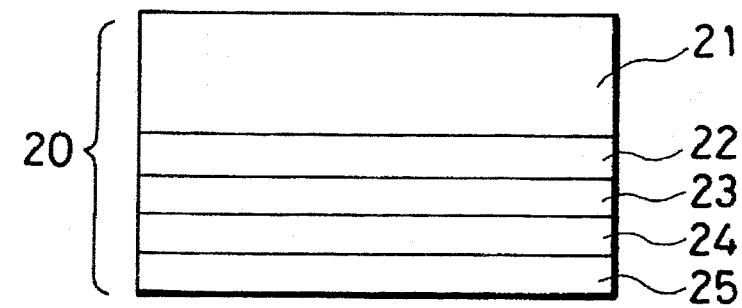
FIG. 6 is a view showing the configuration of the conventional magneto-optical recording medium.
Figure 7:
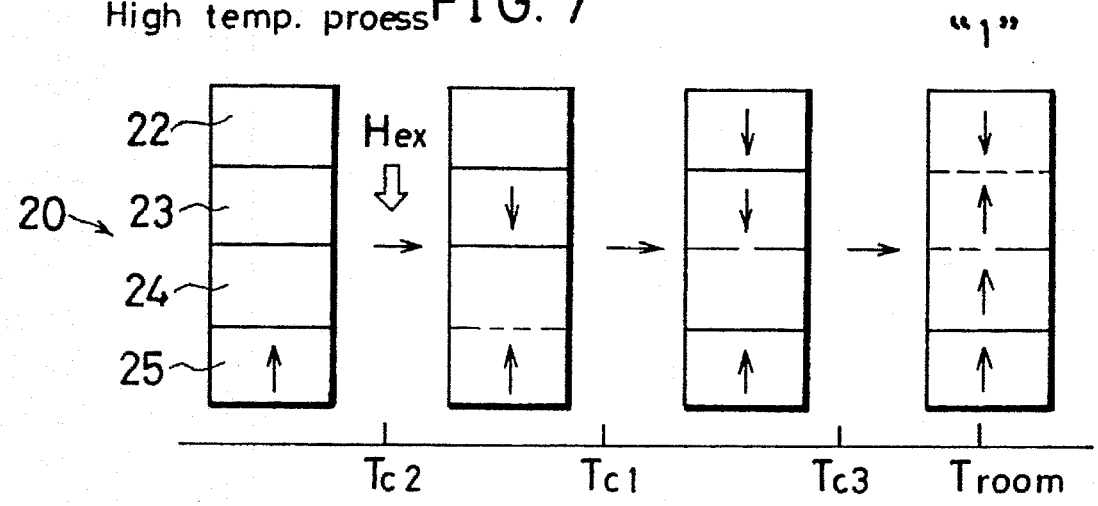
FIG. 7 is an explanatory view showing a recording process of the magneto-optical recording medium of FIG. 6.
Figure 8:
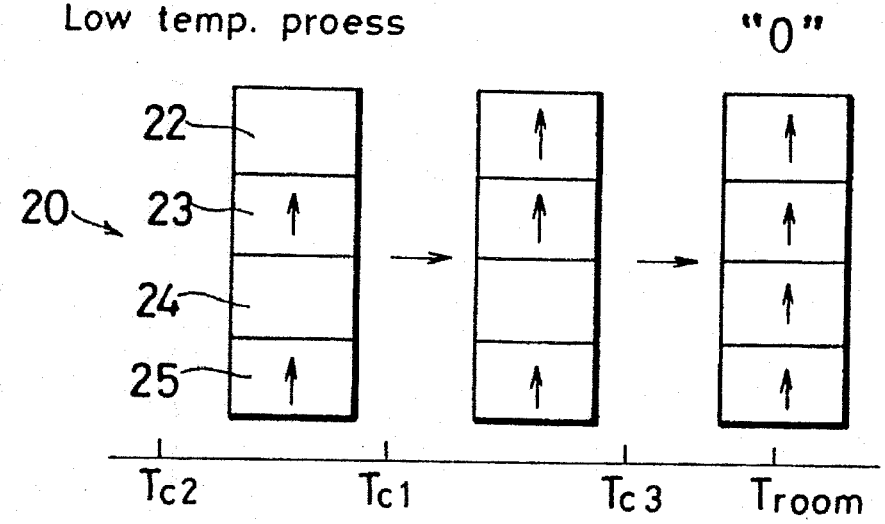
FIG. 8 is an explanatory view showing an initialization process of the magneto-optical recording medium of FIG. 6.
Figure 9A:
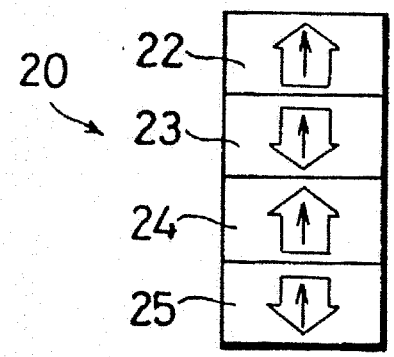
FIG. 9 is an explanatory view showing a magnetization (white arrow) and a sublattice magnetization (arrow) of each of the recorded magnetic layers of the magneto-optical recording medium of FIG. 6.
Figure 9B:
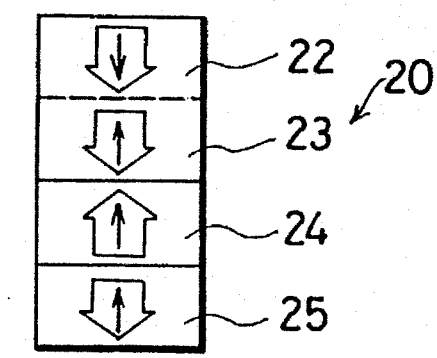

As shown in FIGS. 5 (a)(b), the second magnetic layer 4 exhibits the in-plane magnetization at room temperature. In addition, Tu, at which a transition occurs on the second magnetic layer 4 from the in-plane magnetization to the perpendicular magnetization, is required to be set lower than $Tc_3$. This is because in the temperature range between $T_u$ and $T_{c^3}$, the magnetization direction of the fourth magnetic layer 6 is preferably copied to the second magnetic layer 4 through the third magnetic layer 5.

Next, the overwrite process will be described below in more detail.

First, the temperature of the predetermined small portion of the magneto-optical disk is raised to the vicinity of $Tc_1$, for example, by projecting the laser beam, and then cooled off to the room temperature. In this state, since the second magnetic layer 4 exhibits the perpendicular magnetization at a temperature above Tu, the sublattice magnetization direction of the first magnetic layer 3 is arranged in the sublattice magnetization direction of the fourth magnetic layer 6, thereby initializing the first magnetic layer 3. This recorded state is represented by, for example, "0" state.

In raising the temperature of the third magnetic layer 5, the magnetization remains until $Tc_3$, and the sublattice magnetization direction of the fourth magnetic layer 6 is copied to the sublattice magnetization direction of the second magnetic layer 4 through the third magnetic layer 5. Here, until $Tc_3$, since the coercivity of the first magnetic layer 3 is large, the magnetization direction of the first magnetic layer 3 is not affected by the magnetization of the second magnetic layer 4.

As the temperature is further raised to the vicinity of $Tc_1$, the coercivity of the first magnetic layer 3 becomes small, and the sublattice magnetization direction of the first magnetic layer 3 is arranged in that of the second magnetic layer 4, thereby initializing the first magnetic layer 3.

When the temperature is further raised to the vicinity of $Tc_2$, the magnetization direction of the initialized second magnetic layer 4 is arranged by the external magnetic field Hex (bias magnetic field) for recording whose direction is set opposite to the sublattice magnetization direction of the fourth magnetic layer 6.

Thereafter, as the temperature is cooled off below $Tc_1$, the sublattice magnetization of the second magnetic layer 4 is copied to the first magnetic layer 3. Here, $Tc_3$ of the third magnetic layer 5 is set substantially lower than $Tc_1$. Thus, in the temperature range where the coercivity of the first magnetic layer 3 is small, the magnetization disappears from the third magnetic layer 5, and the exchange coupling force of the fourth magnetic layer 6 is shut off.

Moreover, as the temperature further drops below $Tc_3$, even if the exchange coupling of the fourth magnetic layer 6 is exerted onto the second magnetic layer 4 through the third magnetic layer 5, since the coercivity of the first magnetic layer 3 becomes large, the effect from the fourth magnetic layer 6 can be avoided.

In this way, the sublattice magnetization direction of the first magnetic layer 3 can be reversed with respect to the sublattice magnetization direction of the fourth magnetic layer 6, and the reversed magnetization can be maintained. This recorded state is for example represented by "1" state.

With the above arrangement of the magneto-optical disk, since the perpendicular magnetization directions of the first magnetic layer 3 can be reversed by varying the application temperature, the respective recorded states, i.e., "1" state and "0" state can be obtained.

Furthermore, by setting Tu higher than the room temperature, the second magnetic layer 4 exhibits the in-plane magnetization at room temperature. This permits an equivalent energy condition between the first magnetic layer 3 and the second magnetic layer 4 irrespective of the above recorded states of the first magnetic layer 3.

Namely, the magneto-optical disk is arranged such that the respective magnetization directions of magnetic layers 3–6 at room temperature which correspond to the recorded states of "0" state and "1" state are as shown in FIGS. 1(a) and (b).

Therefore, when compared with the conventional model, the magneto-optical disk is significantly improved by eliminating the occurrence of the state where the high interface wall energy exists between the first magnetic layer 3 and the second magnetic layer 4, and the sublattice magnetization directions of the respective recorded states are antiparallel. As a result, the equivalent energy conditions can be achieved between the above recorded states, and the interface wall energy can be reduced.

Therefore, with the above arrangement, unstable energy condition between the first magnetic layer 3 and the second magnetic layer 4 of the magneto-optical disk due to the high interface wall energy can be prevented.

Since the respective recorded conditions of the first magnetic layer 3 (memory layer) can be stabilized, the significantly improved reliability can be achieved with respect to the change in the reproducing or storing condition, etc.

Additionally, the second magnetic layer 4 is not limited to GdFeCo, and GdCo which has a similar property may be used as well. For the first magnetic layer 3, DyFeCo, TbDyCo, GdDyFeCo, or GdTbFeCo may be used, and for the third magnetic layer 5, GdFe, or DyFeCo may be used. Similarly, for the fourth magnetic layer 6, GdTbCo may be used as well.

Although the magneto-optical disk is employed as the magneto-optical recording medium in the present embodiment, the present invention is not limited to this, and a magneto-optical tape, a magneto-optical card, etc., may be used as well.

Similarly, the sublattice magnetization direction is set the magnetic moment direction of the rare-earth metal at lattice point. However, depending on the composition of the alloys of the magnetic layers, i.e., RErich or TMrich, the magnetic moment direction of the transition metal at a lattice point may be used as well.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, for recording by light intensity modulation, comprising first, second, third, and fourth magnetic layers which are laminated in this order so that an exchange coupling exists between any adjacent layers of said first through said fourth magnetic layers, and a substrate supporting said first through said fourth magnetic layers, wherein:

said first layer is a memory layer for recording information based on magnetization direction and said second layer is a writing layer for copying a magnetization direction to said first magnetic layer;

respective Curie temperatures $Tc_i$ of said first through said fourth magnetic layers satisfy an inequality $Tc_3 < Tc_1 < Tc_2 < Tc_4$, where $i=1, 2, 3,$ or $4$ indicating an ordinal number of said magnetic layers; and said second magnetic layer is formed of a material which exhibits an in-plane magnetization at room temperature, and in which a transition occurs from the in-plane magnetization to a perpendicular magnetization above a transition temperature between the room temperature and the temperature $Tc_3$, thereby permitting overwriting by light intensity modulation and thereby improving the stability of recording of information on said first layer.

2. The magneto-optical recording medium as set forth in claim 1, wherein:

said third magnetic layer is a switching layer for shutting off an exchange coupling from said fourth magnetic layer through said third magnetic layer when a magnetization disappears from said third layer as the temperature thereof is raised; and said fourth magnetic layer is an initializing layer for initializing said first magnetic layer by an exchange coupling through said third and second magnetic layers.

3. The magneto-optical recording medium as set forth in claim 1, further comprising two dielectric films, transparent to laser light, provided so as to sandwich said first to fourth magnetic layers.

4. The magneto-optical recording medium as set forth in claim 1, wherein:

said second magnetic layer is an amorphous alloy of rare-earth transition metal.

5. The magneto-optical recording medium as set forth in claim 1, wherein said first through fourth magnetic layers are amorphous alloys of rare-earth transition metals.

6. The magneto-optical recording medium as set forth in claim 4, wherein:

said second magnetic layer is GdFeCo.

7. A magneto-optical recording medium for recording by light intensity modulation, comprising first, second, third, and fourth magnetic layers which are laminated in this order so that an exchange coupling exists between any adjacent layers of said first through said fourth magnetic layers, and a substrate supporting said first through said fourth magnetic layers, wherein:

said first layer is a memory layer for recording information based on magnetization direction and said second layer is a writing layer for copying a magnetization direction to said first magnetic layer;

respective Curie temperatures Tci of said first through said fourth magnetic layers satisfy an inequality $Tc_3 < Tc_1 < Tc_2 < Tc_4$, where $i=1, 2, 3,$ or $4$, indicating an ordinal number of said magnetic layers; and said second magnetic layer is formed of a material which exhibits an in-plane magnetization at room temperature, and in which a transition occurs from the in-plane magnetization to a perpendicular magnetization above a transition temperature between the room temperature and the temperature $Tc_3$, thereby permitting overwriting by light intensity modulation and thereby improving the stability of recording of information on said first layer; and wherein said second magnetic layer is $Gd_x(Fe_{0.82}Co_{0.18})_{1-x}$ ($0.2<x<0.35$) and said transition temperature is between 60° C. and 70° C.

8. The magneto-optical recording medium as set forth in claim 4, wherein:

said second magnetic layer is GdCo.

9. The magneto-optical recording medium as set forth in claim 1, wherein said magneto-optical recording medium is a magneto-optical disk for recording by modulation of intensity of laser light projected thereon.

10. The magneto-optical recording medium as set forth in claim 1, wherein said substrate has a property that laser light can be transmitted therethrough.

* * * * *